United States Patent [19]

Allen

[11] Patent Number: 4,498,651
[45] Date of Patent: Feb. 12, 1985

[54] APPARATUS FOR TEMPORARILY SUPPORTING A CABLE

[75] Inventor: Frank W. Allen, Wall Township, Bellmar County, N.J.

[73] Assignee: Project Packaging, Inc., Manasquam, N.J.

[21] Appl. No.: 475,697

[22] Filed: Mar. 15, 1983

[51] Int. Cl.³ .............................................. F16L 3/08
[52] U.S. Cl. .................................... 248/65; 248/68.1; 174/41
[58] Field of Search ...................... 248/65, 70, 73, 499, 248/71, 68 R, 74.7, 219.3; 254/134.3 PA; 174/40 R, 41, 45 R; 403/206, 209; 24/115 F, 136 L

[56] References Cited

U.S. PATENT DOCUMENTS

| | | | |
|---|---|---|---|
| 351,640 | 10/1886 | Knapp | 248/71 |
| 776,695 | 12/1904 | Schwarz | 248/74 R |
| 3,233,853 | 2/1966 | Majewski | 248/71 |
| 3,471,110 | 10/1969 | Mack | 248/74 R |
| 3,506,227 | 4/1970 | Jenkins | 248/70 |
| 4,267,994 | 5/1981 | Lynch | 248/65 |

Primary Examiner—William H. Schultz
Assistant Examiner—Robert A. Olson
Attorney, Agent, or Firm—Oblon, Fisher, Spivak, McClelland & Maier

[57] ABSTRACT

Disclosed is apparatus for temporarily supporting a cable which is to be removed from a pole while a replacement cable is being strung on the pole in the position formerly occupied by the cable being replaced. The apparatus includes (a) a first member which extends linearly along an axis and which contains a threaded bore adapted to receive and to be threadedly secured to the projecting end of a tie bolt which passes through the pole and a cable clamp; (b) two cable receiving members projecting from the first member perpendicularly to its axis, the two cable receiving members being spaced apart by a distance slightly greater than the diameter of the cable being replaced; and (c) cable retaining means for securely holding the cable being replaced between the two cable receiving members in position to be supported by the first member.

12 Claims, 7 Drawing Figures 4,498,651

APPARATUS FOR TEMPORARILY SUPPORTING A CABLE

FIELD OF THE INVENTION

This invention relates generally to apparatus for supporting a cable which is to be removed from a pole while a replacement cable is being strung on the pole in the position formerly occupied by the cable being replaced. Specifically, it relates to apparatus for temporarily supporting an old cable-TV cable which is being replaced while the replacement cable is being strung.

BACKGROUND OF THE INVENTION

It is generally unacceptable to take an old cable system completely off a pole line before stringing a new cable system on the pole line, since taking the old cable system completely off the pole line generally entails an interruption in communication. Thus, it is generally necessary to keep the old cable system in place, or at least still up on the pole line, until the new cable system is ready to be cut in.

While it is possible to string the new cable system vertically above or vertically below the old cable system, both options are often unattractive. In the first place, there are minimum distances (set by codes, military regulations, or the like) which must be observed between the new cable system and other cable systems (such as power lines and telephone lines) which are strung on the same pole line. Because space is often at a premium on pole lines, the existing cable systems are generally strung at the minimum distances between the cable systems. Thus, a new cable system can only be strung below the cable system it is replacing if the cable system it is replacing is the bottom one on the pole line, and, correspondingly, it can only be strung above the cable system it is replacing if the cable system it is replacing is the top one on the pole line. Moreover, even if the cable system that is being replaced is either the top or the bottom cable system on the pole line, it is often impractical to put the new cable system in above all the old cable systems because there is insufficient pole remaining above the highest previous cable system or below all the old cable systems because that would make the new cable system dangerously low relative to traffic.

Moreover, even where it is possible to string the new cable system vertically above or vertically below the old cable system, doing so necessitates installation of a wood screw threaded hook, which is expensive and time consuming.

OBJECTS OF THE INVENTION

It is, therefore, the general object of this invention to provide apparatus for temporarily supporting a cable which is to be removed from a pole while a replacement cable is being strung on the pole in the position formerly occupied by the cable being replaced, which apparatus overcomes or ameliorates the foregoing drawbacks in the prior art.

It is a particular object of the invention to provide such apparatus which permits the cable system being replaced to remain strung on the pole line until after the new cable system is cut in, after which the old cable system can be readily and inexpensively taken down.

It is a further object of the invention to provide such apparatus which permits the cable system being replaced to be moved horizontally outwardly from the position it formerly occupied (thereby slightly increasing its spacing from the adjacent cable systems) while a replacememt cable system is being strung on the pole in the position formerly occupied by the cable system being replaced.

It is still a further object of the invention to provide such apparatus which permits the old cable system to be temporarily supported by the same tie rods which formerly supported them and which will support the new cable system.

DETAILED DESCRIPTION OF THE PRESENTLY PREFERRED EMBODIMENTS

Figure 1:
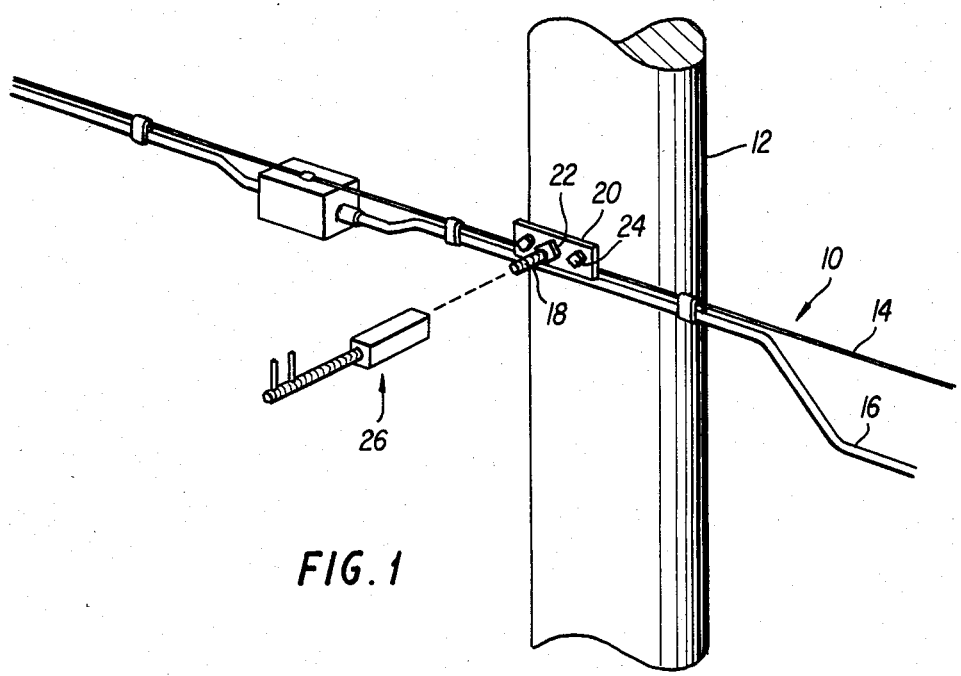
FIG. 1 is an isometric view of a cable system strung on a pole, showing the apparatus of the present invention exploded outwardly from the cable system.

FIG. 1 shows a cable system 10 strung on a pole 12 which is part of a pole line. As is often the case, the cable system 10 consists of a messenger wire 14 and a cable 16 suspended from the messenger wire 14. The cable system 10 is attached to the pole 12 by means of a tie bolt 18 which passes through a hole drilled in the pole 12 and through a cable clamp 20. A nut 22 is used to secure the cable clamp 20 in place, and two bolts 24 clamp the messenger wire 14 within the cable clamp 20.

A central fact which makes this invention practical is the fact that the diameters of poles (which are simply wooden logs) vary considerably. Accordingly, the tie bolts 18 are made somewhat oversize, to ensure that they will protrude through even the thickest poles. This in turn means that the threaded ends of the tie bolts 18 protrude through the cable clamps 20 for several inches, as shown in FIG. 1.

Figure 2:
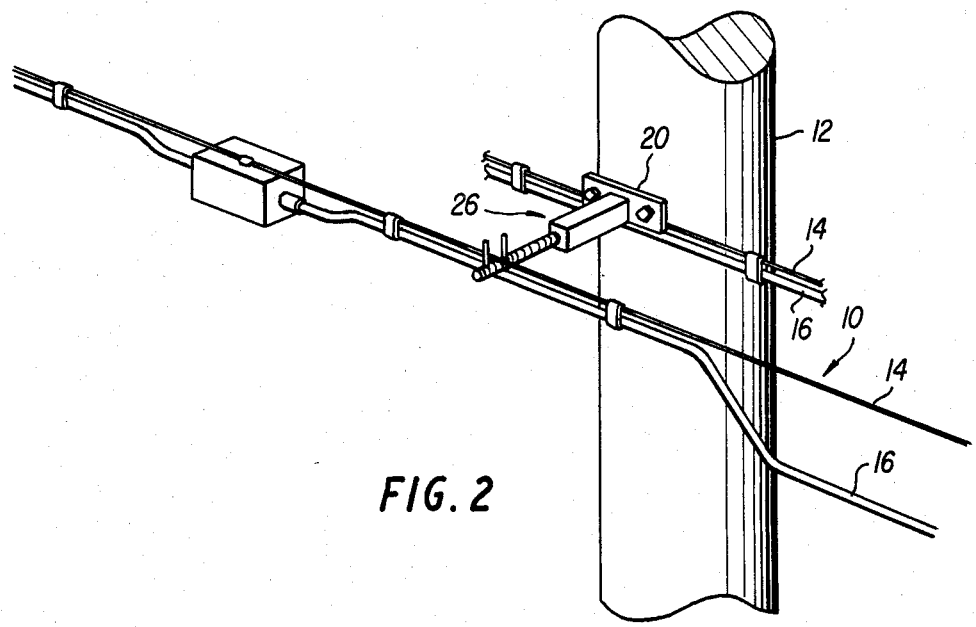
FIG. 2 is an isometric view similar to FIG. 1 but showing the old cable system in its temporary, horizontally displaced position and showing a new cable system strung on the pole.

Apparatus 26 according to a first embodiment of the invention is shown in FIG. 1 in position to be threaded onto the protruding end of the tie bolt 18. In FIG. 2, the apparatus 26 is shown in position on the protruding end of the tie bolt 18, and the cable system 10 is shown displaced horizontally outwardly into its temporary position supported by the apparatus 26 in the manner described hereinafter.

Figure 3:
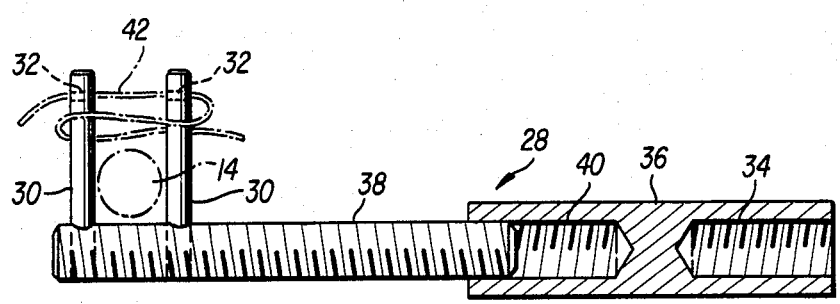
FIG. 3 is a side view of a first embodiment of the present invention.
Figure 4:
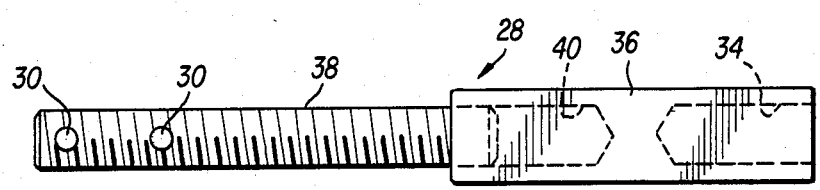
FIG. 4 is a top view of the first embodiment of the present invention.
Figure 7:
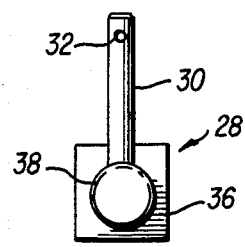
FIG. 7 is a front view of the first embodiment of the present invention.

A first embodiment of the apparatus 26 is shown in FIGS. 3, 4, and 7. It comprises a first member 28, two cable receiving members 30, and a cable retaining means 32.

The first member 28 extends linearly along an axis and contains a threaded bore 34 adapted to receive and to be threadedly secured to the projecting end of the tie bolt 18. Preferably the first member 28 is formed from a block 36 which contains the threaded bore 34 and a projection 38 which extends from the block 36 and from which the two cable receiving members 30 project. The projection 38 may be circular in cross-section, as shown, or it may be of any other convenient shape. If it is circular in cross-section, the axes of the threaded bore 34 and the projection 38 are preferably co-axial.

In the first embodiment, the block 36 also contains a second threaded bore 40 which is co-axial with the first threaded bore 34, and the projection 38 is a threaded stub shaft which is threadedly received in the threaded bore 40.

The two cable receiving members 30 project from the first member 28 perpendicularly to the axis of the first member. The two cable receiving members 30 are spaced apart by a distance slightly greater than the diameter of the cable being replaced, permitting the messenger wire 14 of the cable system 10 to be dropped between the two cable receiving members 30 as shown in FIG. 2. (In a situation where a cable was strung directly, rather than being supported by a messenger wire, the cable itself would be dropped between the two cable receiving members 30.) As shown, the two cable receiving members may simply be stub shafts, the ends of which are threadedly received in the projection 38 of the first member 28.

The cable retaining means 32 are provided to securely hold the message wire 14 between the two cable receiving members 30 in position to be supported by the first member 28. In the embodiment of FIGS. 3, 4, and 7, the cable retaining means 32 are bores which pass through the two cable receiving means 30 and which are adapted to receive a cable-lashing wire 42, as shown in broken line in FIG. 3. The cable-lashing wire 42 is passed through the two bores (which need not be co-axial for this purpose) and snubbed down to securely hold the messenger wire 14 of the cable system 10 in position. Then, when it is desired to take down the old cable system 10, it is a simple matter to cut the cable-lashing wire 42, to remove the old cable system 10 from the apparatus 26, and to remove the apparatus 26 from the tie bolt 18.

Figure 5:
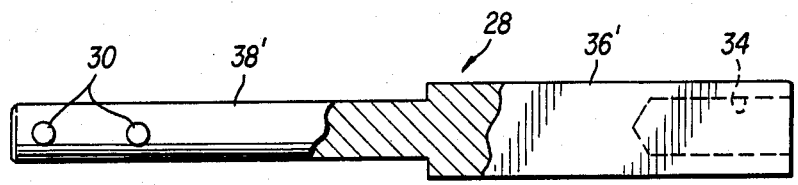
FIG. 5 is a top view of a second embodiment of the present invention.

The second embodiment, shown in FIG. 5, is generally similar to the first embodiment, and the same reference numerals are used to denote the same parts of the two embodiments. The two embodiments differ only in that, in the second embodiment, the projection 38' is integrally attached to the block 36', the primes being used to indicate that the parts 36' and 38' are not identical to the corresponding parts in the first embodiment.

Figure 6:
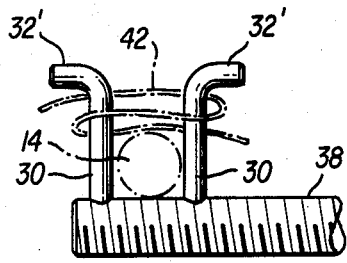
FIG. 6 is a fragmentary side view of a third embodiment of the present invention.

The third embodiment is shown only fragmentarily in FIG. 6. In this embodiment the cable retaining means 32' are projections which extend outwardly from the two cable receiving members 30 and which are adapted to hold the cable-lashing wire 42 in place. Again, the prime on the part number 32 has been used to indicate that the part 32' is not identical to the corresponding part in the first embodiment.

It should be particularly noted that the fact that the cable system 10 is lashed in place obviates any need for registration means on the block 36 or 36'. That is, the cable system 10 remains supported by the projection 38 or 38' even if the block 36 or 36' turns from its vertical position, and the lashing prevents the block 36 or 36' from turning very far from the vertical.

Caveat

While the invention has been illustrated by detailed descriptions of three preferred embodiments thereof, it will be obvious to those skilled in the art that various changes and modifications can be made therein without departing from the true scope of the invention. Accordingly, the invention must be measured by the claims appended hereto and not by the foregoing preferred embodiments thereof.

I claim:

1. A pole line comprising:
   (a) a plurality of poles;
   (b) a plurality of cable hanging apparatus one of which is mounted on each of said plurality of poles in position to receive and support a cable system, each of said plurality of cable hanging apparatuses comprising a tie bolt which extends through the corresponding one of said poles and a cable clamp threadedly received on said tie bolt, said tie bolt having a threaded end which extends through said cable clamp and which protrudes beyond said cable clamp;
   (c) a replacement cable system received in and supported by said plurality of cable hanging apparatuses; and
   (d) a plurality of apparatuses for temporarily supporting a cable which is being removed from said pole line while said replacement cable is being strung on said pole line in the position formerly occupied by the cable being replaced, each of said apparatuses comprising:
      (i) a first member extending linearly along an axis and containing a threaded bore which receives and is threadedly secured to the projecting end of the corresponding one of said tie bolts;
      (ii) two cable receiving members projecting from sid first member perpendicularly to the axis of said first member, said two cable receiving members being spaced apart by a distance slightly greater than the diameter of the cable being replaced; and
      (iii) cable retaining means for securely holding the cable being replaced between said two cable receiving members in position to be supported by said first members.

2. A pole line as recited in claim 1 wherein each of said first members comprises:
   (a) a block which contains said threaded bore and
   (b) a projection which extends from said block and from which said two cable receiving members project.

3. A pole line as recited in claim 2 wherein said projection is threadedly attached to said block.

4. A pole line as recited in claim 2 wherein said projection is integrally attached to said block.

5. A pole line as recited in claim 2 wherein said threaded bore and said projection both extend linearly along the axis of said first member.

6. A pole line as recited in claim 5 wherein:
   (a) said projection is circular in cross-section and
   (b) the axes of said threaded bore and said projection are co-axial.

7. A pole line as recited in claim 1 wherein said two cable receiving members are threadedly received in said first member.

8. A pole line as recited in claim 1 wherein said cable retaining means comprise bores which pass through said two cable receiving means and which are adapted to receive a cable-lashing wire.

9. A pole line as recited in claim 6 wherein:
   (a) said two cable receiving members are threadedly received in said first member and (b) said cable retaining means comprise bores which pass through said two cable receiving means and which are adapted to receive a cable-lashing wire.

10. A pole line as recited in claim 1 wherein said cable retaining means comprise projections which extend outwardly from said two cable receiving members and which are adapted to hold a cable-lashing wire in place.

11. A pole line as recited in claim 6 wherein:

(a) said two cable receiving members are threadedly received in said first members and
(b) said cable retaining means comprise projections which extend outwardly from said two cable receiving members and which are adapted to hold a cabel-lashing wire in place.

12. A pole line as recited in claim 1 wherein the diameters of said poles vary.

* * * * *